United States Patent [19]
Fogg et al.

[11] Patent Number: 4,591,620
[45] Date of Patent: May 27, 1986

[54] COPOLYMER, A FILM FORMING COMPOSITION AND A METHOD OF COATING A SURFACE WITH THE COMPOSITION

[75] Inventors: Sidney G. Fogg, Ashtead; Frank C. Robertson, Woking, both of England

[73] Assignee: The British Petroleum Company p.l.c., London, England

[21] Appl. No.: 494,008

[22] Filed: May 12, 1983

[30] Foreign Application Priority Data

May 26, 1982 [GB] United Kingdom ............... 8215395
Oct. 21, 1982 [GB] United Kingdom ............... 8230073

[51] Int. Cl.$^4$ .............................................. C08F 8/30
[52] U.S. Cl. ............................. 525/328.8; 525/329.5; 525/329.6; 525/329.9; 525/330.5; 525/376
[58] Field of Search ............ 525/328.8, 329.5, 329.6, 525/329.9, 330.5, 376

[56] References Cited

U.S. PATENT DOCUMENTS 4,171,413 10/1979 Hartman et al. ............... 525/376
4,210,565  7/1980 Emmons ........................ 525/376
4,250,070  2/1981 Ley et al. ..................... 525/376

FOREIGN PATENT DOCUMENTS 51-69489 6/1976 Japan .

Primary Examiner—Joseph L. Schofer
Assistant Examiner—Bernard Lipman
Attorney, Agent, or Firm—Morgan, Finnegan, Pine, Foley & Lee

[57] ABSTRACT

A water soluble copolymer of polymerizable esters of unsaturated carboxylic acids having the hydrazide group as a substituent comprises a major proportion of monomer units which are methyl acrylate and/or methyl methacrylate and a minor proportion of co-monomer units which are one or more alkyl esters of acrylic acid or methacrylic acid wherein the alkyl group comprises at least four carbon atoms. The copolymer has film forming properties which make it useful for use in protective coatings. The invention includes a film forming composition comprising the copolymer and a cross-linking agent which cross-linking agent is an aldehyde or an organic thermosetting resin containing methylol or methoxy groups, the copolymer and cross-linking agent being dissolved in an aqueous medium in amounts such that they will form a film when applied to a surface. The composition is applied to a surface and heated at 120° to 180° C. for from 5 mins. to 4 hours to produce a water insoluble coating from a water based composition containing the water soluble copolymer.

9 Claims, No Drawings

COPOLYMER, A FILM FORMING COMPOSITION AND A METHOD OF COATING A SURFACE WITH THE COMPOSITION

The present invention relates to a copolymer of polymerisable esters of unsaturated carboxylic acids into which copolymer hydrazide groups have been introduced, to a water based film forming composition containing the copolymer and to a method of coating a surface with the composition.

Polymers and copolymers of polymerisable esters of unsaturated carboxylic acids having the hydrazide group as a substituent are known. For example, published Japanese patent application No. 1976-69489 discloses a urea scavenger wherein such a copolymer is reacted with formaldehyde or glyoxal. However, it has now surprisingly been found that certain copolymers of polymerisable esters of unsaturated carboxylic acids into which copolymers hydrazide groups have been introduced are water soluble and have film forming properties which make the copolymers useful in water based film forming compositions.

Thus according to the present invention a copolymer comprising polymerisable esters of unsaturated carboxylic acids into which copolymer hydrazide groups have been introduced is characterised in that the copolymer comprises a major proportion of monomer units which are methyl acrylate or methyl methacrylate and a minor proportion of co-monomer units which are one or more alkyl esters of acrylic acid or methacrylic acid wherein the alkyl group comprises at least four carbon atoms.

The monomer units may be either methyl acrylate or methyl methacrylate or may be a mixture of the two. Similarly the co-monomer units may be a mixture of acrylic esters and/or methacrylic esters.

The alkyl group of co-monomer units preferably has from 4 to 12 carbon atoms. Suitable co-monomers include butyl, pentyl, hexyl and lauryl acrylates and methacrylates and their branched chain derivatives.

The ratio of monomer units to co-polymer units in the copolymer is preferably from 20:1 to 10:8 and is more preferably from 4:1 to 3:2.

The copolymer into which the hydrazide groups are introduced may be prepared by conventional polymerisation methods. Preferably solution polymerisation is used. Azobisisobutyronitrile is a suitable polymerisation initiator.

The introduction of hydrazide groups into the copolymer may be carried out using known methods. For example, a suitable method comprises dissolving or dispersing the copolymer in a water-soluble alcohol such as methanol or a mixed water-alcohol solution. If the copolymer has been produced by solution polymerisation with alcohol as solvent, it may be directly passed to the hydrazidation step after completion of polymerisation. The solution or suspension is agitated, heated to a temperature of from 50° to 80° C. and hydrazine hydrate added. The reaction is exothermic and so the hydrazine hydrate is preferably added slowly. Bulk addition of the hydrazine hydrate would make temperature control difficult and side reactions would be favoured.

The amount of hydrazide groups required to be introduced into the copolymer to make it water soluble depends on the monomers used to prepare the copolymer. The hydrazide content is preferably from 10 to 20 mole%. Typically the hydrazide content of a copolymer having butyl acrylate as the comonomer units is from 11 to 17 mole%.

The copolymer having the hydrazide group as a substituent preferably has a molecular weight of from 500 to 10,000. A chain transfer agent such as, for example, butane thiol may be added to the monomers prior to polymerisation in order to control the molecular weight of the copolymer.

The copolymer is water soluble and the invention includes an aqueous solution of the copolymer. The water soluble copolymer is suitable for use in water based protective coatings.

It has been found that the adhesive properties of a coating comprising the copolymer may be improved by the inclusion of certain other monomers. Thus the invention includes a copolymer which also comprises an adhesion promoting co-monomer selected from the group comprising hydroxy ethyl acrylate, hydroxy ethyl methacrylate, water soluble derivatives of hydroxy ethyl acrylate or hydroxy ethyl methacrylate and unsaturated carboxylic acid, such as for example acrylic acid or methacrylic acid. Preferably the amount of the adhesion promoting monomer included in the copolymer is from 5 to 24 percent by weight of the methyl acrylate or methyl methacrylate monomer.

The invention includes a film forming composition comprising a copolymer as described and a cross-linking agent which cross-linking agent is a water soluble aldehyde or an organic thermosetting resin containing methylol or methoxy groups, the copolymer and cross-linking agent being dissolved or dispersed in an aqueous medium, the amount of copolymer and cross-linking agent being such that they will form a film when applied to a surface.

The water soluble aldehyde may be difunctional. Longer curing times may be obtained using an aldehyde having in its molecule at least three carbon atoms excluding the carbon atom(s) in the aldehyde group(s). Suitable aldehydes for use as cross-linking agents include formaldehyde, glyoxal and glutaraldehyde. The relative number of aldehyde groups to hydrazide groups in the composition may be from 5:1 to 1:5 preferably from 4:1 to 1:1.

Organic thermosetting resins containing methylol and/or methoxy groups are known. Preferably the resins are soluble or dispersable in an aqueous medium, alcohol or a water/alcohol mixture. Suitable resins include, for example, phenol-formaldehyde resin; urea-formaldehyde resin; ortho, meta or para cresol-formaldehyde resin; resorcinol-formaldehyde resin; thiourea-formaldehyde resin; guanidine formaldehyde resin; quanamine-formaldehyde resin; melamine-formaldehyde resin; hexamethoxy melamine resin and cardol-formaldehyde resin. Cardol is an alkyl substituted resorcinol derived from cashew nut shell oil.

Particularly suitable resins are methylated resins such as, for example, methylated hexamethoxy melamine resin and methylated melamine-formaldehyde resin.

The relative number of methoxy or methylol groups in the resin to hydrazide groups in the copolymer is preferably 1:1. In practice the number of methylol or methoxy groups in a particular resin may not be known and simple experiments may be required to determine the amounts of resin and copolymer required.

The aqueous medium in which the copolymer and cross-linking agent are dissolved or dispersed is preferably fresh water. The concentration of the copolymer in the water is suitably from 20 to 60 percent by weight of the total weight of the copolymer solution.

The composition once made up should preferably remain useable for at least 8 hours. The "pot-life" of the composition will depend on such factors as the particular copolymer and cross-linking agent used, their concentrations in the composition, the temperature and the hydrazide content of the copolymer. The copolymer and cross-linking agent would generally be stored separately and the composition made up as required. The copolymer and cross-linking agent may be stored as concentrates and mixed with water when required or alternatively one or both of the components may be stored as an aqueous solution or dispersion.

The compositions according to the present invention may contain other materials such as pigments, corrosion inhibitors, viscosity modifiers etc.

The present invention includes a method of coating a surface which comprises applying a composition as described above to a surface by any of the known methods such as, for example, brushing or spraying, and then heating the coated surface to a temperature in the range 120° to 180° C. for a period of from 5 mins to 4 hours.

The film forming properties of the copolymer make it possible to form a coating by applying an aqueous solution of the copolymer to a surface and heating it in the absence of a cross-linking agent. However, such a coating would require heating for a longer period of time and would be less stable than a coating cross-linked with a suitable aldehyde or organic resin containing methylol or methoxy groups. The method according to the present invention produces a water insoluble coating from a water based composition containing a water soluble copolymer.

The invention is illustrated by the following examples:

EXAMPLE 1

The following components were mixed together and polymerisation carried out for 6 hours at a temperature of 70° C. under a nitrogen atmosphere;

5 g azobisisobutyronitrile, as polymerisation initiator
100 g methyl acrylate
50 g butyl acrylate
20 g methacrylic acid
400 cm$^3$ water
600 cm$^3$ industrial methylated spirits The copolymer solution was maintained at 70° C. and, without isolating the copolymer, 120 cm$^3$ (2.47 moles) hydrazine hydrate was slowly added over a period of 20 minutes. The heating was discontinued and the mixture stirred for a further 6 hours until the mixture returned to ambient temperature (about 22° C.). The solvent was then removed using a rotary evaporator. The polymer yield was 117 g and the hydrazide content was 11%. The viscosity of a 36% solution of the polymer measured using a Brookfield Viscometer (29 rpm, spindle No. 5) was 3800 centipoises ($\times 10^{-3}$ kg/ms) and of a 10% solution (100 rpm, spindle No. 2) was 360 centipoises ($\times 10^{-3}$ kg/ms).

The copolymer was dissolved in water to give a 40 percent solution by weight. 0.8 cm$^3$ of 10 percent solutions of different aldehydes were added and mixed with 5 cm$^3$ samples of this copolymer solution. The compositions were then brushed onto 0.8 mm thick, cold rolled mild steel plates and heated for two hours at 120° C. The compositions all produced translucent pale yellow coatings on the plate. These coatings were subjected to a Konig Pendulum hardness test and a conical mandrel test (ASTM D522-60) to assess the elongation of the coating. The results are given in Table 1. The Konig Pendulum hardness results are given as a percentage; this is a percentage of the hardness of glass. Also included in Table 1 are the results of the tests carried out on a coating comprising the polymer solution without any aldehyde present. Although the hardness and elongation of this coating was similar to the coatings produced using an aldehyde cross-linking agent it had a lower resistance to water and solvents.

TABLE 1

| Hardness and Elongation of Coatings produced in Example 1 | | | | |
|---|---|---|---|---|
| Aldehyde | Aldehyde Number of moles added | Thickness of Coating μm | Konig Pendulum Hardness % | Conical Mandrel Elongation % |
| None | — | 3 | 61 | >30 |
| formaldehyde | $2.6 \times 10^{-3}$ | 4 | 62 | >30 |
| glyoxal | $1.4 \times 10^{-3}$ | 4 | 61 | >30 |
| glutaraldehyde | $0.8 \times 10^{-3}$ | 5 | 66 | >30 |

The coatings cross-linked using an aldehyde were immersed in water, acetone and toluene for 24 hours without showing any evidence of dissolution or degradation of the coating. The coating cross-linked in the absence of aldehyde blistered when immersed in water and the film swelled.

EXAMPLE 2

The following components were mixed together and polymerisation carried out for five hours at 70° C. under a nitrogen atmosphere, 5 g azobisisobutyronitrile
100 g methyl acrylate
10 g lauryl methacrylate
20 g methacrylic acid
1000 cm$^3$ industrial methylated spirit The copolymer solution was maintained at 70° C. and, without first separating the copolymer, 180 cm$^3$ (3.7 moles) hydrazine hydrate was added over a period of 20 minutes. The heating was discontinued and the mixture stirred for 6 hours until the temperature fell to ambient (about 22° C.). The copolymer was precipitated as a white powder by adding the mixture to a three fold excess of cold acetone. The yield was 122 g.

30 g of the copolymer was dissolved in 70 cm$^3$ of water and 0.5 g of a 5% by weight solution of formaldehyde ($0.8 \times 10^{-3}$ moles) was mixed with 5 cm$^3$ of this solution. The composition was brushed onto a mild steel plate and placed in an oven at 120° C. for four hours. The composition formed a clear glossy film on the metal surface. The König Pendulum Hardness of the coating was 62% and the elongation as determined by the conical mandrel test (ASTM D522-60) was greater than 30%.

EXAMPLE 3

The following components were mixed and polymerisation carried out for 6 hours at a temperature of 70° C. under a nitrogen atmosphere.

5 g azobisisobutyronitrile, as polymerisation initiator
100 g methyl acrylate 50 g butyl acrylate
20 g methacrylic acid
400 cm$^3$ water
600 cm$^3$ industrial methylated spirits
2.5 cm$^3$ butane thiol, as chain transfer agent The copolymer solution was maintained at 70° C. and, without isolating the copolymer, 120 cm³ (2.47 moles) hydrazine hydrate was slowly added over a period of 20 minutes. The heating was discontinued and the mixture stirred for a further 6 hours until the mixture returned to ambient temperature (about 22° C.). The solution was then removed using a rotary evaporator.

A 50% solution of the copolymer had a viscosity of 360 centipoises ($\times 10^{-3}$ kg/ms). The inclusion of the chain transfer agent thus reduced the molecular weight of the polymer, as evidenced by the lower viscosity of the polymer solution compared with the similar polymer prepared in Example 1.

2 g of a 50% solution of formaldehyde was added to 10 g of a 50% solution of the copolymer and the composition brushed onto mild steel plates. The plates were subjected to different heat treatments and the Konig pendulum hardness test and conical mandrel test (ASTM D522-60) carried out on each coating. The results are shown in Table 2.

TABLE 2

| Heat Treatment | | Konig Pendulum | Conical Mandrel |
|---|---|---|---|
| Temperature °C. | Time mins | Hardness % | Test % elongation |
| 120 | 240 | 67 | >30 |
| 160 | 30 | 60 | >30 |
| 180 | 10 | 60 | >30 |

EXAMPLE 4

The following components were mixed together and polymerisation carried out for 6 hours at a temperature of 70° C. under a nitrogen atmosphere;

2.5 g azobisisobutyronitrile, as polymerisation initiator
100 g methyl methacrylate
50 g butyl acrylate
20 g methacrylic acid
1000 cm³ industrial methylated spirits
2.5 cm³ butane thiol The copolymer solution was maintained at 70° C. and, without isolating the copolymer, 120 cm³ (2.47 moles) hydrazine hydrate was slowly added over a period of 20 minutes. The heating was discontinued and the mixture stirred for a further 6 hours until the mixture returned to ambient temperature (about 22° C.). The solvent was then removed using a rotary evaporator. The polymer yield was 160 g and the hydrazide content was 13%.

The isolated copolymer was dissolved in water to form solutions of various concentrations. The viscosity at 23° C. was determined using a Brookfield viscometer. The results are given in Table 3.

TABLE 3

| Viscosities of Aqueous Solutions of the Polymer | | | |
|---|---|---|---|
| | Brookfield Viscometer | | Viscosity |
| Concentration (% wt of polymer in soln) | Spindle | Speed (rpm) | cP ($\times 10^{-3}$ kg/ms) |
| 50 | 4 | 20 | 2 700 |
| 40 | 4 | 20 | 480 |
| 30 | 4 | 50 | 100 |
| 27 | 4 | 50 | 40 |

The copolymer was dissolved in water to give a 27% solution by weight. 1 g of different resins having methylol groups were added to and mixed with 5 g samples of the 27% polymer solution.

The resins used were;
Resin 1—methylated melamine-formaldehyde sold by Ciba Geigy under the trade name Melolam ML1769
Resin 2—methylated hexamethoxy melamine sold by Ciba Geigy under the trade name Cibamin ML 1000
Resin 3—modified melamine-formaldehyde sold by BASF under the trade name Urecoll SMV
Resin 4—phenolic resin sold by BP Chemicals under the trade name Resole J 2226S
Resin 5—urea-formaldehyde resin sold by BASF under the trade name Urecoll S Resins 1, 2, 3 and 5 were dispersed in water to give a concentration of 35% by weight of resin. Resin 4 was dispersed in n-propanol to the same concentration. The compositions were brushed onto mild steel plates and heated at 180° C. The samples were heated for 5, 15 or 30 minutes. The coatings were subjected to a Konig Pendulum Hardness test and a conical mandrel test (ASTM DS 22-60) to assess the elongation of the coating. All the coatings had a Conical Mandrel Elongation of more than 30%. The Konig Pendulum Hardness results are given in Table 4.

TABLE 4

| Konig Pendulum Hardness of Coatings | | | |
|---|---|---|---|
| | Konig Pendulum Hardness (%) Heating Time | | |
| Resin | 5 mins | 15 mins | 30 mins |
| 1 | 37 | 66 | 74 |
| 2 | 43 | 78 | 79 |
| 3 | 65 | 81 | 80 |
| 4 | 46 | 71 | 70 |
| 5 | 65 | 81 | 80 |

The coated steel plates which had been heated for 15 or 30 minutes were immersed in water for 3 days without showing any evidence of dissolution, swelling or degradation of the coatings.

EXAMPLE 5

The following components were mixed together and polymerisation carried out for 4 hours at 70° C. under a nitrogen atmosphere;

2.5 g azobisisobutyronitrile, as polymerisation initiator
75 g methyl methacrylate
25 g methyl acrylate
50 g butyl acrylate
20 g methacrylic acid
2.5 cm³ butane thiol
400 cm³ water
100 cm³ industrial methylated spirits The copolymer solution was maintained at 70° C. for 4 hours and, without isolating the copolymer, 15 cm³ (0.3 moles) hydrazine hydrate was added over a period of 20 minutes. The heating was continued with stirring for a further 70 mins and then the heating was discontinued and the mixture stirred for a further 6 hours until the mixture had cooled to ambient temperature (about 22° C.). The hydrazide content of the copolymer was 15%.

An aqueous solution was prepared having a copolymer content of 26% by weight. The viscosity of the solution at 23° C. was 80 cP ($\times 10^{-3}$ kg/ms). A 50% dispersion in water of Cibamin ML 1000, methylated hexamethoxy melamine sold by Ciba Geigy was added to the copolymer solution in the ratio of resin solution to copolymer solution of 1:5 weight by weight.

The composition was sprayed onto a number of mild steel panels and heated at temperatures in the range 140° to 150° C. for 15 to 30 minutes. The translucent pale yellow coatings had film thicknesses in the range 10 to 15 μm.

Coated panels were immersed in industrial methylated spirits, acetone, toluene and chloroform for 24 hours. No deterioration in appearance or physical properties of the coatings was detected.

The coatings on some of the panels were scratched through to the bare metal and the panels subjected to the ASTM B117-73 salt spray test for 360 hours. The rusting of the panels was assessed using the visual test of the Philidelphia Society for Coating Technology. The percentage area of rust on the plates was from 0.3 to 1% which corresponds to a rating of 7 to 6 on scale of 0 to 10 where 10 is a good result and 0 is a bad result. The maximum cut-back i.e. the maximum spread of under film corrosion from the scratch was between 1.5 and 2.5 mm for the panels tested. This corresponds to ratings of 8 to 7 in the Buser Sclae of Corrosion Creep which is also a scale of 0 to 10 where 10 is good and 0 is bad.

EXAMPLE 6

The following components were mixed together and polymerisation carried out for 6 hours at 70° C. under a nitrogen atmosphere;

2.5 g azobisisobutylronitrile, as polymerisation initiator
100 g methyl acrylate
50 g butyl acrylate
20 g hydroxy ethyl methacrylate
2.5 cm$^3$ butane thiol
1000 cm$^3$ industrial methylated spirits The copolymer was maintained at 70° C. and, without isolating the copolymer, 60 cm$^3$ (1.2 moles) of hydrazine hydrate was slowly added over a period of 20 minutes. The heating was discontinued and the mixture stirred for about 6 hours until the mixture had cooled to ambient temperature (about 22° C.). The copolymer was isolated by removal of the solvent. The polymer yield was 168 g and the hydrazide content was 13%.

The isolated copolymer was dissolved in water to form a 25%wt solution. The viscosity at 23° C. was 40 cP ($\times 10^{-3}$ kg/ms). 1 g of a 5% solution of formaldehyde was added to 10 g of the copolymer solution and the composition brushed onto mild steel panels. Some of the panels were heated at 180° C. for 15 minutes and some for 30 minutes. The Konig Pendulum Hardness of the coatings heated for 15 minutes was 64%. All the panels had Conical Mandrel Test elongations in excess of 30%. The coated panels were immersed in water for 24 hours without showing any evidence of dissolution or degradation of the coating.

We claim:

1. An acrylic copolymer containing hydrazide groups comprising the reaction product of (a) a copolymer formed by polymerising a mixture comprising esters of unsaturated carboxylic acids and (b) hydrazine wherein the mixture of esters comprises a major proportion of monomer units which are methyl acrylate or methyl methacrylate and a minor proportion of co-monomer units which are one or more alkyl esters of crylic acid or methacrylic acid in which the alkyl group comprises at least four carbon atoms and wherein the copolymer is reacted with the hydrazine in the presence of water.

2. An acrylic copolymer as claimed in claim 1 wherein the hydrazine is hydrazine hydrate.

3. An acrylic copolymer as claimed in claim 1 in which the co-monomer units are one or more alkyl esters of acrylic acid or methacrylic acid with an alkyl group of from 4 to 12 carbon atoms.

4. An acrylic copolymer as claimed in claim 1 in which the ratio of monomer units to co-monomer units in the copolymer is from 20:1 to 10:8.

5. An acrylic copolymer as claimed in claim 4 in which the ratio of monomer units to co-monomer units in the copolymer is from 4:1 to 3:2.

6. An acrylic copolymer as claimed in claim 1 in which the hydrazide content is from 10 to 20 mole %.

7. An acrylic copolymer as claimed in claim 1 which also comprises an adhesion promoting co-monomer selected from the group comprising hydroxy ethyl acrylate, hydroxy ethyl methacrylate, water soluble derivatives of hydroxy ethyl methacrylate and unsaturated carboxylic acids.

8. An acrylic copolymer as claimed in claim 7 in which the copolymer comprises 5 to 24% by weight of the adhesion promoting co-monomer based on the weight of the methyl acrylate or methyl methacrylate monomer.

9. A composition suitable for use in film forming compositions comprising an aqueous solution of a copolymer as claimed in claim 1.

* * * * *

UNITED STATES PATENT AND TRADEMARK OFFICE
CERTIFICATE OF CORRECTION

PATENT NO. : 4,591,620

DATED : May 27, 1986

INVENTOR(S) : Sidney G. Fogg et al

It is certified that error appears in the above-identified patent and that said Letters Patent is hereby corrected as shown below:

Claim 1, line 16, "crylic" should read --acrylic--.

Signed and Sealed this

Tenth Day of March, 1987

Attest:

DONALD J. QUIGG

Attesting Officer     Commissioner of Patents and Trademarks